United States Patent
Chen et al.

(10) Patent No.: US 9,474,119 B1
(45) Date of Patent: Oct. 18, 2016

(54) DISPLAY DEVICE AND DRIVING METHOD OF BACKLIGHT MODULE

(71) Applicant: AU Optronics Corporation, Hsin-Chu (TW)

(72) Inventors: Ciou-Yin Chen, Hsin-Chu (TW);
Shiang-Lin Lian, Hsin-Chu (TW);
Pei-Yun Teng, Hsin-Chu (TW);
Chen-Hsien Liao, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 0 days.

(21) Appl. No.: 14/738,923

(22) Filed: Jun. 14, 2015

(30) Foreign Application Priority Data

May 6, 2015 (TW) .............................. 104114439 A

(51) Int. Cl.
*F21V 9/00* (2015.01)
*H05B 33/08* (2006.01)

(52) U.S. Cl.
CPC ...... *H05B 33/0845* (2013.01); *H05B 33/0815* (2013.01)

(58) Field of Classification Search
CPC ............ F21K 9/50; F21S 10/02; F21V 9/08; F21V 9/10
USPC .................................................. 362/230–231
See application file for complete search history.

(56) References Cited

U.S. PATENT DOCUMENTS

| 9,095,029 B2* | 7/2015 | Lu ...................... H05B 33/0863 |
| 2002/0145685 A1 | 10/2002 | Mueller-Mach et al. |
| 2009/0281604 A1* | 11/2009 | De Boer ............... A61M 21/00 607/88 |
| 2014/0185281 A1* | 7/2014 | Lee ..................... H01L 25/0753 362/231 |
| 2015/0327342 A1* | 11/2015 | Lu ..................... H05B 33/0863 315/294 |

FOREIGN PATENT DOCUMENTS

| CN | 101799138 | 5/2012 |
| CN | 203025372 | 6/2013 |
| CN | 103680420 A | 3/2014 |

* cited by examiner

*Primary Examiner* — Jason M Crawford
(74) *Attorney, Agent, or Firm* — McClure, Qualey & Rodack, LLP

(57) ABSTRACT

A display device and driving method of a backlight module are disclosed. The display device includes a display panel and a backlight module. The backlight module includes a first light source, a second light source and a control module. The first light source emits a first spectrum with a first stimulus and the second light source emits a second spectrum with a second stimulus. The second stimulus is substantially bigger than the first stimulus. The control module enables the second light source during a first period and enables the first light source during a second period.

7 Claims, 2 Drawing Sheets

DISPLAY DEVICE AND DRIVING METHOD OF BACKLIGHT MODULE

CROSS-REFERENCE TO RELATED APPLICATIONS

This non-provisional application claims priority under 35 U.S.C. §119(a) on Patent Application No(s). 104114439 filed in Taiwan, R.O.C. on May 6, 2015, the entire contents of which are hereby incorporated by reference.

TECHNICAL FIELD

The disclosure relates to a display device and a method of controlling a backlight module, more particularly to a display device including at least two backlight sources whose spectrums are different, and to a control method for switching backlight sources according to different modes.

BACKGROUND

Melatonin is a hormone made by the pineal gland located in the human brain and can adjust wake/sleep cycles. When the photosensitive ganglion cells of the eyes receive blue light with a certain wavelength range, the brain will reduce the melatonin level in the body, resulting in the enhancement of alertness. Blue light sources, existing everywhere in our daily lives, seriously affect human's biological clock. Moreover, the current treatment for melatonin imbalance mainly uses medication. Therefore, it is required to control the percentage of blue light emitted by a display device according to our biological clocks.

SUMMARY

According to one or more embodiments, the disclosure provides a display device. In an embodiment, the display device includes a display panel and a backlight module. The backlight module includes a first light source, a second light source, and a control module. The first light source emits light having a first spectrum, and the second light source emits light having a second spectrum different from the first spectrum. The control module enables the second light source during a working mode (a first period) and enables the first light source during a non-working mode (a second period). Integrating the first spectrum and a blue-light hazard function B(λ) in a wavelength range from 380 nm to 780 nm results in a first blue-light hazard intensity. Integrating the second spectrum and the blue-light hazard function B(λ) in the wavelength range from 380 nm to 780 nm results in a second blue-light hazard intensity. The second blue-light hazard intensity is greater than the first blue-light hazard intensity.

According to one or more embodiments, the disclosure provides a method of controlling a backlight module including a first light source and a second light source. The first light source emits light having a first spectrum, and the second light source emits light having a second spectrum different from the first spectrum. Integrating the first spectrum and a blue-light hazard function B(λ) in a wavelength range from 380 nm to 780 nm results in a first blue-light hazard intensity. Integrating the second spectrum and the blue-light hazard function B(λ) in the wavelength range from 380 nm to 780 nm results in a second blue-light hazard intensity. The second blue-light hazard intensity is greater than the first blue-light hazard intensity. In an embodiment, the method includes the following steps. Determine whether a first period is proceeding. If yes, the second light source is enabled. If not, the first light source is enabled.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
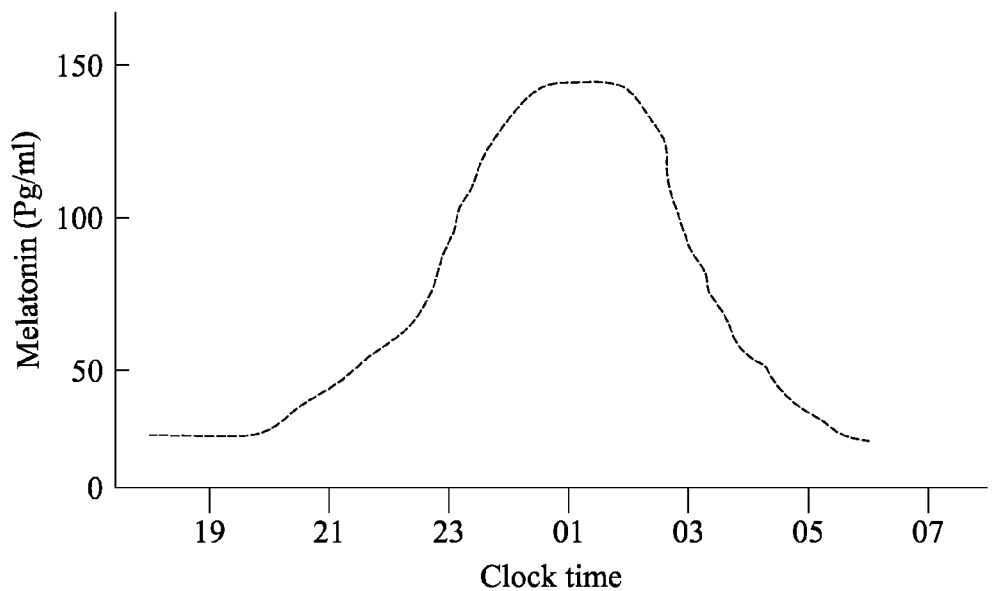
FIG. 1 is a schematic curve diagram of the secretion of human melatonin versus clock time according to an embodiment of the disclosure.

Melatonin is a hormone made by the pineal gland located in the human brain. Light decreases the melatonin production while darkness causes the body to produce more melatonin. FIG. 1 is a schematic curve diagram of the secretion of human melatonin versus clock time, which shows that the melatonin level rises up to its highest peak from 11:00 PM (or namely 23:00) to 2:00 AM. Human's biological clock controls the sleep-wake rhythm by increasing or decreasing the melatonin level. When the melatonin level rises up to a certain level, people will feel tired and sleepy. Light reaching the eyes causes the pineal gland to suppress the secretion of melatonin. Because suitably-increasing short-wavelength light in a work period may increase light energy that is efficiently received by the retinal photosensitive ganglion cells of the eyes, to cause the decrease of the melatonin level. Therefore, decreasing the melatonin level in the body may efficiently ease tiredness, thereby enhancing work efficiency during work. On the other hand, suitably-decreasing short-wavelength light before going to sleep may decrease the receipt of blue light and then cause the increase of the melatonin level in the body. Therefore, it may help people sleep and even enhance sleeping quality.

On Earth, daytime is roughly the period on any given point of the planet's surface during which it experiences natural illumination from indirect or (especially) direct sunlight. During May, June, and July, the northern hemisphere is exposed to more direct sunlight because the hemisphere faces the sun.

For the Northern Hemisphere, the time of sunrise varies in the four seasons. The sun in the summer, especially in June, rises the earliest out of all seasons, and the sun rises, for example, at about 5:00 AM and goes down at about 7:00 PM (or namely 19:00). The sunrise in the spring and fall, especially in March and September, is later than that in the summer, and the sun rises at around 7:00 AM and goes down at about 6:00 PM (or namely 18:00). The sunrise in the winter, especially in December, is the latest of all the season, and the sun rises at about 8:00 AM and goes down at around 5:00 PM (or namely 17:00). The sunrise and sunset vary according to the longitude and latitude of a location.

In general, most people work during the daytime. For example, the time from 8:00 AM to 5:00 PM is a common working time, and the rest of the time is the non-working time. Some people work at nighttime, but no matter if people work during the day or at nighttime, they all feel tired and sleepy because of a relatively high melatonin level in their bodies. Therefore, the disclosure provides embodiments to employ a display device to control the secretion of melatonin during a person's working time or non-working time.

Figure 2:
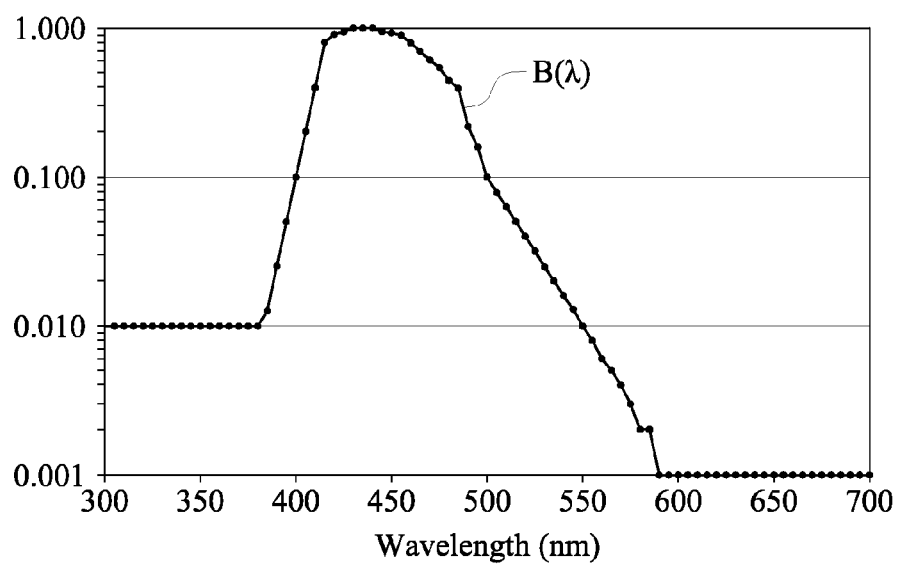
FIG. 2 is a schematic curve diagram of illustrating a blue-light hazard function.

International Electrotechnical Commission (IEC) has established standards for human eye safety with various sources of light radiation, such as the IEC62471 standard which is related to photobiological effects of blue light exposure and uses a blue-light hazard function. FIG. 2 illustrates a blue-light hazard function $B(\lambda)$, where light in the wavelength range from 380 nm to 780 nm stimulates the retina by different degrees. The blue-light hazard intensity function $A(\lambda)$ is the product of the blue-light hazard function $B(\lambda)$ and the transmission intensity function $T(\lambda)$ relates to the light source and indicates the stimulation degree that light emitted by the light source stimulates the retina. The blue-light hazard intensity function $A(\lambda)$ is a function involving an independent variable, i.e. the wavelength A, and is given by:

$$A(\lambda)=T(\lambda)*B(\lambda)$$

where $T(\lambda)$ is a function indicating a transmission intensity of a display panel when the display device displays a white screen, and $B(\lambda)$ is a blue-light hazard function.

Integrating the blue-light hazard intensity function $A(\lambda)$ over the wavelength range of 380 nm to 780 nm results in a blue-light hazard intensity, and the blue-light hazard intensity indicates how much blue light stimulating the retina is in the light emitted by the light source.

Figure 3:
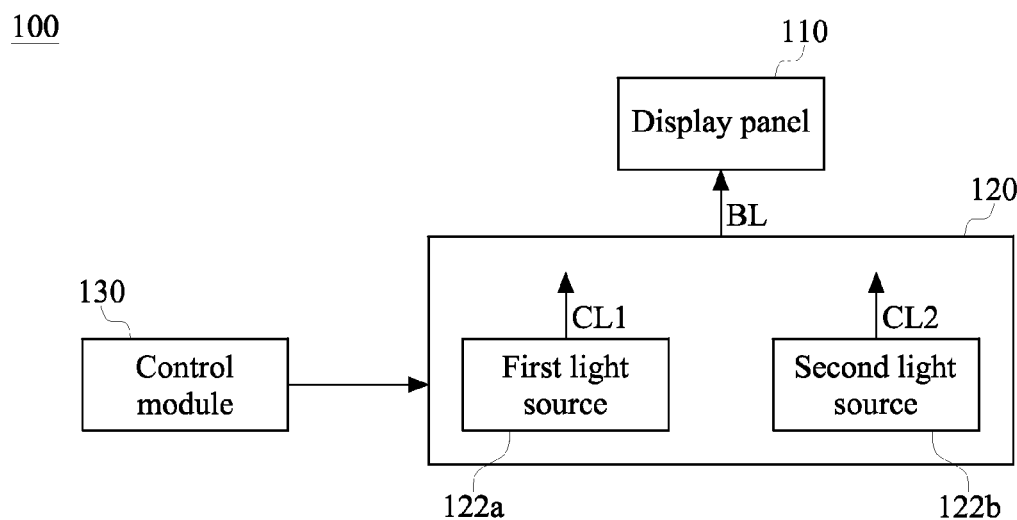
FIG. 3 is a schematic view of a display device according to an embodiment of the disclosure.

FIG. 3 is a schematic view of a display device 100 according to an embodiment of the disclosure. The display device 100 includes a display panel 110 and a backlight module 120. The backlight module 120 is disposed at the backside of the display panel 110 (e.g. the bottom lighting as shown in FIG. 3) or one side of the display panel 110 (e.g. the side-back lighting). The backlight module 120 includes a first light source 122a, a second light source 122b, and a control module 130. The first light source 122a emits light CL1 with a first spectrum 210, and the second light source 122b emits light CL2 with a second spectrum 220. A blue-light hazard intensity obtained by the blue-light hazard function $B(\lambda)$ in relation to the first spectrum 210 is less than a blue-light hazard intensity obtained by the blue-light hazard function $B(\lambda)$ in relation to the second spectrum 220. The control module 130 enables the second light source 122b during a first period, and then the backlight module 120 projects backlight BL with the second spectrum 220 to the display panel 110. Because the second spectrum 220 corresponds to a stronger blue-light hazard intensity, light from the enabled second light source 122b may suppress the melatonin level in the user's body and then enhance the user's work efficiency when the user is working. During a second period (non-working period), the control module 130 enables the first light source 122a but disables the second light source 122b. Most people may take a rest during the second period, so only the first light source 122a with a weaker blue-light hazard intensity may be enabled.

Figure 4:
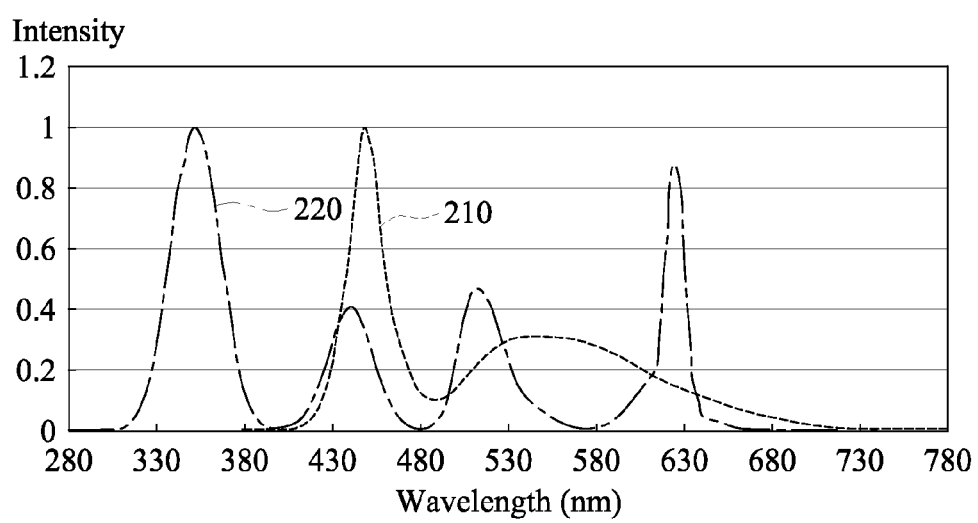
FIG. 4 is a schematic spectrum diagram of the first and second light sources in the display device in FIG. 3 according to an embodiment of the disclosure.

FIG. 4 is a schematic spectrum diagram of the first and second light sources in the display device in FIG. 3 according to an embodiment of the disclosure. The first spectrum 210 includes a first peak in a wavelength range from 380 nm to 480 nm, and this first peak has an intensity that is at least greater than 0.7. The first spectrum 210 includes a second peak in a wavelength range from 480 nm to 680 nm, and the second peak has an intensity that is from 0.2 to 0.4.

The second spectrum 220 includes a first peak in the wavelength range from 320 nm to 420 nm, and the first peak has an intensity that is at least greater than 0.7 The second spectrum 220 includes a second peak in a wavelength range from 420 nm to 480 nm, and the intensity of the second peak is between 0.2 and 0.6. The second spectrum 220 includes a third peak in a wavelength range from 480 nm to 580 nm, and the intensity of the third peak is between about 0.2 and 0.6. The second spectrum 220 includes a fourth peak in a wavelength range from 580 nm to 680 nm, and this fourth peak has an intensity that is between around 0.8 and 0.9.

The first peak of the first spectrum 210 and the first peak of the second spectrum 220 have a difference of at least 60 nm in wavelength therebetween. Integrating the blue-light hazard function $B(\lambda)$ over the wavelength range of 380 nm to 780 nm can obtain a blue-light hazard intensity $A(\lambda)$. The blue-light hazard intensity corresponding to the first spectrum 210 is $0.11(W \cdot m^{-2} \cdot sr^{-1})$, and the blue-light hazard intensity corresponding to the second spectrum 220 is $0.13 (W \cdot m^{-2} \cdot sr^{-1})$, where "W" represents watt, "m" represents meter, "sr" represents steradian, and the intensity is a normalized value. The blue-light hazard intensity corresponding to the first spectrum 210 is less than the blue-light hazard intensity corresponding to the second spectrum 220. Accordingly, enabling the second light source 122b during the first period may suppress the secretion of melatonin.

In this embodiment, the first light source 122a is carried out by the cooperation between a blue light emitted diode (LED) and yellow phosphor powder, or the cooperation between a blue LED and at least two of yellow, red and green phosphor powder in an example and emits light having the first spectrum 210 with at least two peaks as shown in FIG. 4. The second light source 122b is carried out by the cooperation between an ultraviolet (UV) LED and yellow phosphor powder or the cooperation between an UV LED and at least two of blue, green and red phosphor powder in an example and emits light having the second spectrum 220 with at least three peaks as shown in FIG. 4. Although in this embodiment the first spectrum 210 merely has two peaks and the second spectrum 220 merely has four peaks, the disclosure will not be limited thereto. That is, the two backlight sources each can be any possible light source capable of emitting light having a blue-light hazard intensity different from a blue-light hazard intensity of the other backlight source.

In this embodiment, the first period is a working period during the daytime or at nighttime, and the second period is the non-working period. During the working period, the second light source 122b is enabled to suppress the secretion of melatonin, and during the non-working period, only the first light source 122a is enabled.

In another embodiment, both the first light source 122a and the second light source 122b are enabled during the first period (referred to as the working period). This may ensure that the user senses light with a higher blue-light hazard intensity emitted by the display device 100 to decrease the melatonin level in the body during the first period. During the second period, only the first light source 122a with a lower blue-light hazard intensity is enabled.

In another embodiment, the spectrum of the first light source 122a includes a first peak in a wavelength range from 380 nm to 480 nm and a second peak and a third peak in a wavelength range from 480 nm to 680 nm. The spectrum of the second light source 112b is sufficiently the same as the previous embodiment and thus, will not be repeated hereinafter. A blue-light hazard intensity obtained by the spectrum of the first light source 122a in relation to the blue-light hazard function $B(\lambda)$ is smaller than a blue-light hazard intensity obtained by the spectrum of the second light source 112b in relation to the blue-light hazard function $B(\lambda)$. Therefore, the control module 130 enables the second light source 122b and enables or disables the first light source 122a during the first period (i.e. working period), and enables only the first light source during the second period (i.e. non-working period).

In an embodiment, the control module 130 stores default data about the first and second periods set according to users' lifestyles. According to such data, the control module 130 controls the enabling of the second light source 122b with a higher blue-light hazard intensity and the enabling of the first light source 122a with a lower blue-light hazard intensity. For example, data about when the first period starts and how long the first period is, is preset according to different time zones and seasons, and the time except the first period in a day is set as the second period. The second light source 122b is enabled during the first period as the first light source is enabled during the second period. To people working in the daytime and resting at nighttime, the first period is preset as the time from 5:00 AM to 7:00 PM in the summer during which the sunrise is the earliest of all the other seasons.

In another embodiment, the first period and the second period are changeable according to the user's requirement. For example, user's working periods vary according to various job requirements or job functions. For instance, shift work requires workers to change or rotate shifts (i.e. their working periods). Therefore, the second light source 122b whose blue-light hazard intensity is higher than the blue-light hazard intensity of the first light source 122a, is enabled during the first period to suppress the secretion of melatonin. To achieve this function, the display device 100 in an embodiment includes a user interface for users to input the setting of the first and second periods. According to the setting of the first and second periods, the control module 130 controls the enabling of the first and second light sources in order to control the secretion of melatonin.

In an embodiment, the backlight module 120 is a side-backlight module, and the first light source and the second light source are disposed at the same side or two sides of the display panel 110.

In an embodiment, the disclosure also provides a method of controlling a backlight module in the display device 100 as shown in FIG. 3. The method includes the following steps. First, determine whether the first period is proceeding. When the first period is proceeding, the control module 130 enables the second light source 122b. Otherwise, the second period is proceeding, and the first light source 122a is enabled. The light CL1 emitted by the first light source 122a has a first spectrum, and the light CL2 emitted by the second light source 122b has a second spectrum. The blue-light hazard intensity obtained by the blue-light hazard function $B(\lambda)$ in relation to the first spectrum is less than the blue-light hazard intensity obtained by the blue-light hazard function $B(\lambda)$ in relation to the second spectrum, and the blue-light hazard intensity can refer to the aforementioned description and will not be repeated hereinafter.

In summary, the display device in the disclosure controls the switching on and off of the backlight source with a higher blue-light hazard intensity to control the secretion of melatonin in the body. When a user is working, suitably-increasing the percentage of blue light or blue-green light may increase the efficient absorption of light energy in the photosensitive ganglion cells to suppress the melatonin level in the body and then ease tiredness and the feeling of being sleepy. Easing the feeling of being sleepy during work may enhance work efficiency. On the other hand, before the user goes to bed, decreasing the absorption of blue light in the photosensitive ganglion cells by the decreasing of the percentage of blue light in the light emitted by the display device may cause the increase of the melatonin level in the body. This may help the user sleep and enhance the sleeping quality.

What is claimed is:

1. A display device, comprising:
a display panel; and
a backlight module disposed at a side or backside of the display panel, for emitting light to the display panel, and the backlight module comprising:
a first light source for emitting light under a first spectrum;
a second light source for emitting light under a second spectrum that is different from the first spectrum; and
a control module for enabling the second light source during a first period and enabling the first light source during a second period,
wherein a first blue-light hazard intensity is obtained by integrating a product of a blue-light hazard function $B(\lambda)$ and a transmission intensity function related to the first light source over a wavelength range of 380 nm to 780 nm, a second blue-light hazard intensity is obtained by integrating a product of the blue-light hazard function $B(\lambda)$ and a transmission intensity function related to the second light source over the wavelength range of 380 nm to 780 nm, and the second blue-light hazard intensity is greater than the first blue-light hazard intensity.

2. The display device according to claim 1, wherein the first spectrum comprises a first peak between a wavelength of 380 nm and a wavelength of 480 nm, the second spectrum comprises a first peak between a wavelength of 320 nm and a wavelength of 420 nm, and the first peak of the first spectrum and the first peak of the second spectrum have a difference of at least 60 nm in wavelength therebetween.

3. The display device according to claim 1, wherein the first light source is disabled during the first period.

4. The display device according to claim 1, wherein the second light source is disabled during the second period.

5. The display device according to claim 1, wherein the first spectrum related to the first light source comprises at least two peaks, and the second spectrum related to the second light source has four peaks.

6. A method of driving a backlight module comprising a first light source and a second light source, wherein the first light source emits light having a first spectrum, the second light source emits light having a second spectrum different from the first spectrum, a first blue-light hazard intensity is obtained by integrating a product of a blue-light hazard function $B(\lambda)$ and a transmission intensity function related to the first light source over a wavelength range of 380 nm to 780 nm, a second blue-light hazard intensity is obtained by integrating a product of the blue-light hazard function $B(\lambda)$ and a transmission intensity function related to the second light source over the wavelength range of 380 nm to 780 nm, the second blue-light hazard intensity is greater than the first blue-light hazard intensity, and the method comprises:
- determining whether a first period starts;
- enabling the second light source during the first period; and
- merely enabling the first light source at time except the first period.

7. The method according to claim 6, wherein the first light source is enabled during the first period.

* * * * *